US007335103B2

(12) United States Patent
Seelig et al.

(10) Patent No.: US 7,335,103 B2
(45) Date of Patent: Feb. 26, 2008

(54) GAMING DEVICE AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 248 days.

(21) Appl. No.: 11/138,934

(22) Filed: May 25, 2005

(65) Prior Publication Data

US 2006/0003833 A1 Jan. 5, 2006

Related U.S. Application Data

(63) Continuation-in-part of application No. 10/937,018, filed on Sep. 9, 2004, and a continuation-in-part of application No. 10/883,489, filed on Jun. 30, 2004.

(51) Int. Cl.
*G07F 17/34* (2006.01)
*A63F 13/00* (2006.01)

(52) U.S. Cl. ............................ 463/22; 463/16; 463/20; 463/46; 273/143 R; 273/138.2; 273/144 R; 273/144 B

(58) Field of Classification Search ............ 463/16–20, 463/22–27, 46; 273/143 R, 138.1, 138.2, 273/144 R, 144 A, 144 B
See application file for complete search history.

(56) References Cited

U.S. PATENT DOCUMENTS

| | | | |
|---|---|---|---|
| 5,566,940 A * | 10/1996 | Powell | 273/144 A |
| 2004/0002373 A1 | 1/2004 | Kaminkow | |

* cited by examiner

*Primary Examiner*—Benjamin Layno
(74) *Attorney, Agent, or Firm*—Ian F. Burns & Associates, P.C

(57) ABSTRACT

A gaming device having at least one tubular display container, a display object holder disposed to hold a plurality of movable display objects in an individually controlled manner, a display object actuator and a controller, is disclosed. Game-related indicia on the tubular display container convey the outcome of a game when the display object actuator is activated to propel a selected movable display object into the tubular display container where the object may activate a game outcome portion of the tubular display container or the object may be captured in a selected compartment of the tubular display container. Optionally, player input devices may be used to enhance player participation by enabling the player to select a movable display object or a specific tubular display container before the movable display object is propelled into the tubular display container or a plurality of tubular display containers. A method of playing a game using the above device is also disclosed.

21 Claims, 13 Drawing Sheets

GAMING DEVICE AND METHOD

CROSS REFERENCES TO RELATED APPLICATIONS

This application is a continuation-in-part application of U.S. patent application Ser. No. 10/937,018, filed on Sep. 9, 2004; and also a continuation-in-part application of U.S. patent application Ser. No. 10/883,489, filed on Jun. 30, 2004. The above referenced applications are hereby expressly incorporated by reference in their entireties.

BACKGROUND OF THE INVENTION

The present invention relates to a display device for use with a gaming apparatus that includes a tubular display container configured to constrain movable display objects after the movable display objects are propelled into the tubular display container. The present invention further involves a display object holder where the movable display objects are held in an individually controlled manner prior to being selected and propelled into the tubular display container.

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices also tend to be more successful if they utilize physical objects rather than simulations. Although video devices and electronic signs can be used for display devices, players are more attracted to display devices that utilize physical objects. Physical objects can be even more effective display devices if they are movable and they are used in combination with lights and sounds.

U.S. Patent Application Publication No. 2004/0002373 appears to disclose a gaming device involving a display area with a plurality of aligned channels, each channel containing a movable object, an actuator at the base of each channel and a partitioner for dividing each channel into a plurality of sections. However, the disclosed gaming device does not provide for holding the movable objects in an individually controlled manner in an area separate from the channels before engagement with the actuator. Thus, the disclosed device does not allow for the increased control and ease of operation accrued to the game operator by the gaming devices of the present invention where (i) the movable objects are held in an individually controlled manner in an object holder separate from the display container and (ii) one movable object can be selected from a plurality of different movable objects for placement into the display container.

BRIEF SUMMARY OF THE INVENTION

In one embodiment of the present invention, a gaming device is provided that includes a gaming apparatus configured to allow a player to place a wager and play a game, at least one tubular display container coupled to the gaming apparatus, a plurality of movable display objects, a display object holder coupled to the tubular display container and configured to hold the plurality of movable display objects in an individually controlled manner, at least one display object actuator associated with the display object holder; and at least one controller in communication with the gaming apparatus, the tubular display container, the display object holder and the display object actuator, where the controller is configured to select one movable display object from the plurality of movable display objects in the display object holder.

In another embodiment the tubular display container may include a segmenting mechanism configured to divide the tubular display container into a plurality of compartments where the segmenting mechanism is in communication with the controller. The controller may be further configured to determine a random game outcome and display the game outcome to the player by activating the display object actuator and the segmenting mechanism. In a further embodiment the tubular display container may include at least one sensor where the sensor is in communication with the controller.

The gaming device of the present invention may further include at least one player input device configured to allow the player to (i) select a movable display object from the plurality of movable display objects in the display object holder or (ii) select a specific tubular display container from a plurality of tubular display containers (when the gaming device includes more than one tubular display container) prior to activation of the display object actuator.

The present invention also provides a method of conducting a game on a gaming device involving (a) allowing a player to place a wager and play the game on the gaming device, (b) randomly determining a game outcome, (c) holding a plurality of movable display objects in an individually controlled manner in a display object holder, (d) selecting one movable display object from the plurality of movable display objects in the display object holder, and (e) propelling the selected movable display object from the display object holder into a tubular display container.

The method of the present invention may further include allowing the player to (i) select the movable display object from the plurality of movable display objects in the display object holder or (ii) select a specific tubular display container from a plurality of tubular display containers (when more than one tubular display container is provided for game play), by way of a player input device, prior to propelling the movable display object from the display object holder into the tubular display container(s).

For purposes of the present invention, it is understood that the term "display object" refers to the movable display objects (prize balls) of the present invention. That is, when the terms such as "display object holder" or "display object actuator" are used, a holder or actuator for the movable display objects is being designated. Movable display objects suitable for use in the present invention include, for example, objects comprising shapes selected from the group consisting of spherical, polyhedral, animal and human shapes; optionally, the movable display objects may bear game-related indicia. Typically, the movable display objects are balls, although the display objects may also take the form of cubes (for example, dice), pyramids, stars or miniature human-like (such as elves and leprechauns) or animal-like (such as dogs and cats) forms, for example.

Typically, the tubular display containers take the form of cylindrical tubes. For example, the tubular display containers may be presented in different forms to suit a particular theme of the gaming apparatus, such as straws, pipes, towers, cannons, gun or rifle barrels and silos. Alternatively, the tubular display container may be modified so that the base of the tubular display container is larger than its top end, for example, when the tubular display container is presented in the form of a large cannon or tower. Typically, the tubular display containers of the present invention are at least partially transparent to allow the player to view the movable display object when it is propelled into the tubular display container. Optionally, the tubular display container may be covered at least partially with structural framing to provide decorative or support aspects to the present invention. Typically, the structural framing may cover a portion of the tubular display container such that at least some portions of both the front and back of the tubular display container are viewable by the game player.

Among the advantages of the present invention are those directed to (i) providing enhanced player participation by enabling the player to select a movable display object or a specific tubular display container before the movable display object is propelled into the tubular display container, (ii) providing an increased degree of control and ease of operation to the game operator by arranging for each of the movable display objects to be held in an individually controlled manner in the display object holder, and (iii) increasing the anticipation and surprise aspect of playing a game by configuring the display object holder so that the movable display objects (for example, prize balls bearing game-related indicia or symbols) are hidden from view of the player. In the latter case, an atmosphere of hope and expectation is introduced into the game that increases the interest of the player since the player is not able to see the prize balls prior to their appearance in the tubular display container, thus keeping the magnitude of any possible winning result unknown until the last possible moment.

The above description sets forth certain features of representative embodiments disclosed herein. There are other features that will become apparent to those skilled in the art from this specification. In this respect, before explaining specific embodiments of the invention in detail, it is to be understood that the invention is not limited in its application to the details of the construction and to the arrangement of the components set forth in the following description or as illustrated in the drawings, nor is the invention necessarily a solution of each problem noted in the Background Section above. In addition, the various disclosed embodiments are capable of being practiced and carried out in various ways. Also, it is to be understood that the phraseology and terminology employed herein are for the purpose of brief description and should not be regarded as limiting.

BRIEF DESCRIPTION OF THE DRAWINGS

Typical embodiments are shown in the accompanying drawings wherein.

In the Detailed Description below, the applicants may utilize various spatially orienting terms such as "upper," "lower," "horizontal," and "vertical." It is understood that these terms are used for ease of description of various embodiments with respect to the drawings but are not necessarily in themselves limiting or requiring an orientation as thereby described in the Detailed Description.

DETAILED DESCRIPTION OF THE INVENTION

Figure 1A:
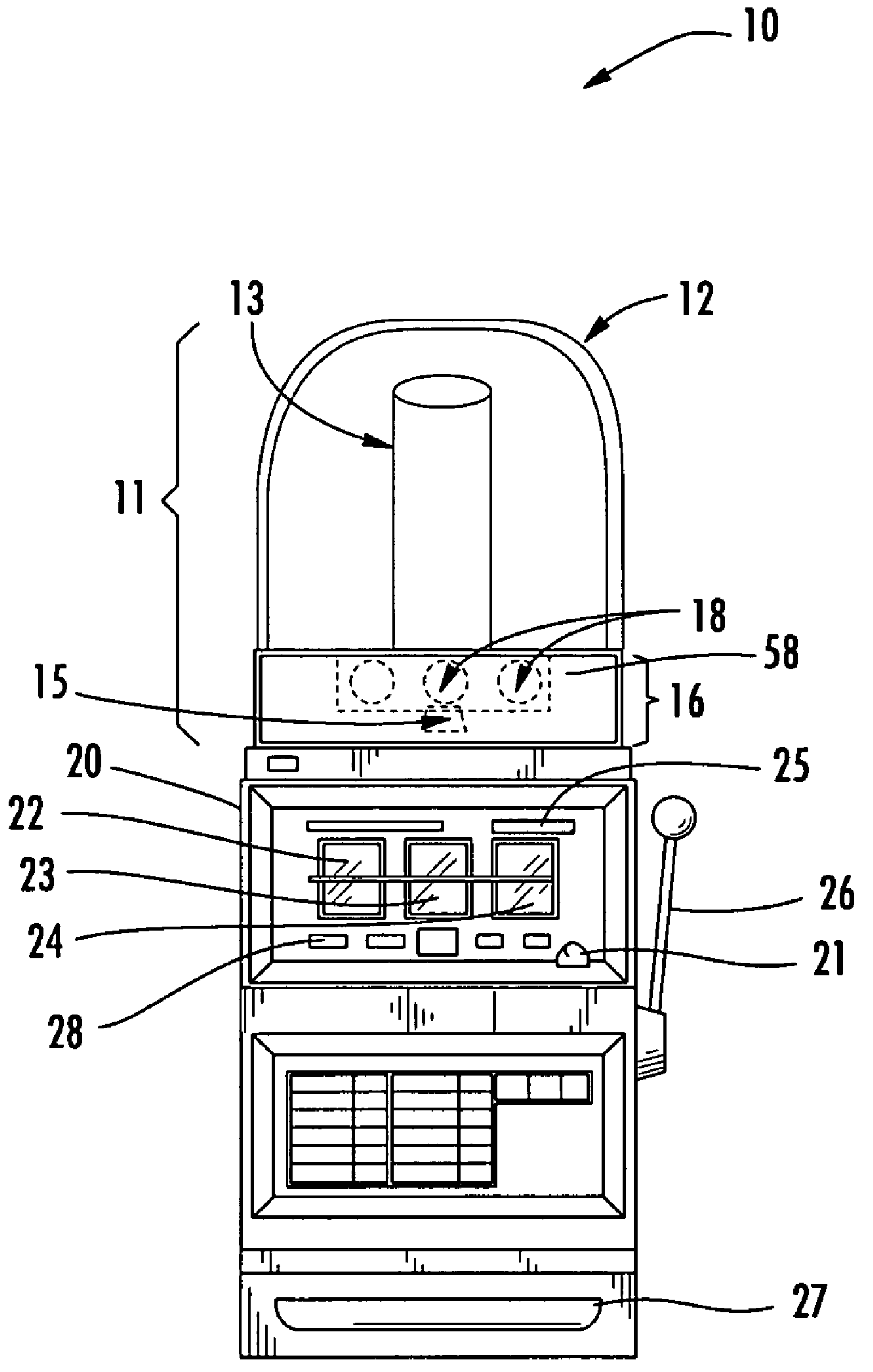
FIG. 1A is substantially a front view of a gaming device of the present invention.

As shown in FIG. 1A, one embodiment disclosed herein comprises a gaming device, generally indicated by reference number 10. Gaming device 10 comprises a display area 11 and a game apparatus 20. Display area 11 comprises at least one tubular display container 13 and may also include display housing 12 and display base area 16.

Game Apparatus

With continuing reference to FIG. 1A, game apparatus 20 may be any of a large number of devices that are adapted to allow players to play a game. For example, game apparatus 20 may utilize reel displays, such as spinning reels 22-24 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one embodiment, game apparatus 20 may be an S Plus™ model gaming device manufactured by International Game Technology in Reno, Nev.

Game apparatus 20 is typically controlled by an electronic controller 82 (see FIG. 2A) that utilizes a random number generator. The outcome of the game may be determined by comparing the random number to a table of outcomes stored in a memory and accessed by controller 82. In one embodiment, this may involve a processor in combination with memory (not shown) and random number generator software (not shown) configured to generate a random number. In an alternative embodiment, an integrated circuit or a ROM (read-only-memory) may be configured to generate a random number. The random number generator produces a random or pseudo random number for each game for gaming device 10. The random number is then used to determine the prize to be awarded according to a table, typically referred to as a "pay table." A number of different tables of outcomes may be used and different tables may be used for different games. The tables can be designed so that different prizes have different probabilities of being awarded. Such design techniques are well known in gaming; U.S. Pat. No. 4,448,419, U.S. Pat. No. 5,456,465 and U.S. Pat. No. 5,823,874 maybe consulted for additional details and specific pay table designs. It is understood that gaming device 10 may operate in many other ways and still achieve the objects of the present invention.

In one embodiment a controller 82 generates a random number. The random number may then be compared to a pay table such as the simple pay table shown below:

| Random Number | Location Number | Amount Paid |
|---|---|---|
| 0.00 to 0.03 | 1 | $25.00 |
| 0.04 to 0.20 | 2 | 0.00 |
| 0.21 to 0.45 | 3 | $5.00 |
| 0.46 to 0.50 | 4 | $30.00 |
| 0.51 to 0.60 | 5 | Progressive |
| 0.61 to 0.96 | 6 | Free Play |
| 0.96 to 1.00 | 7 | 10× |

Figure 1B:
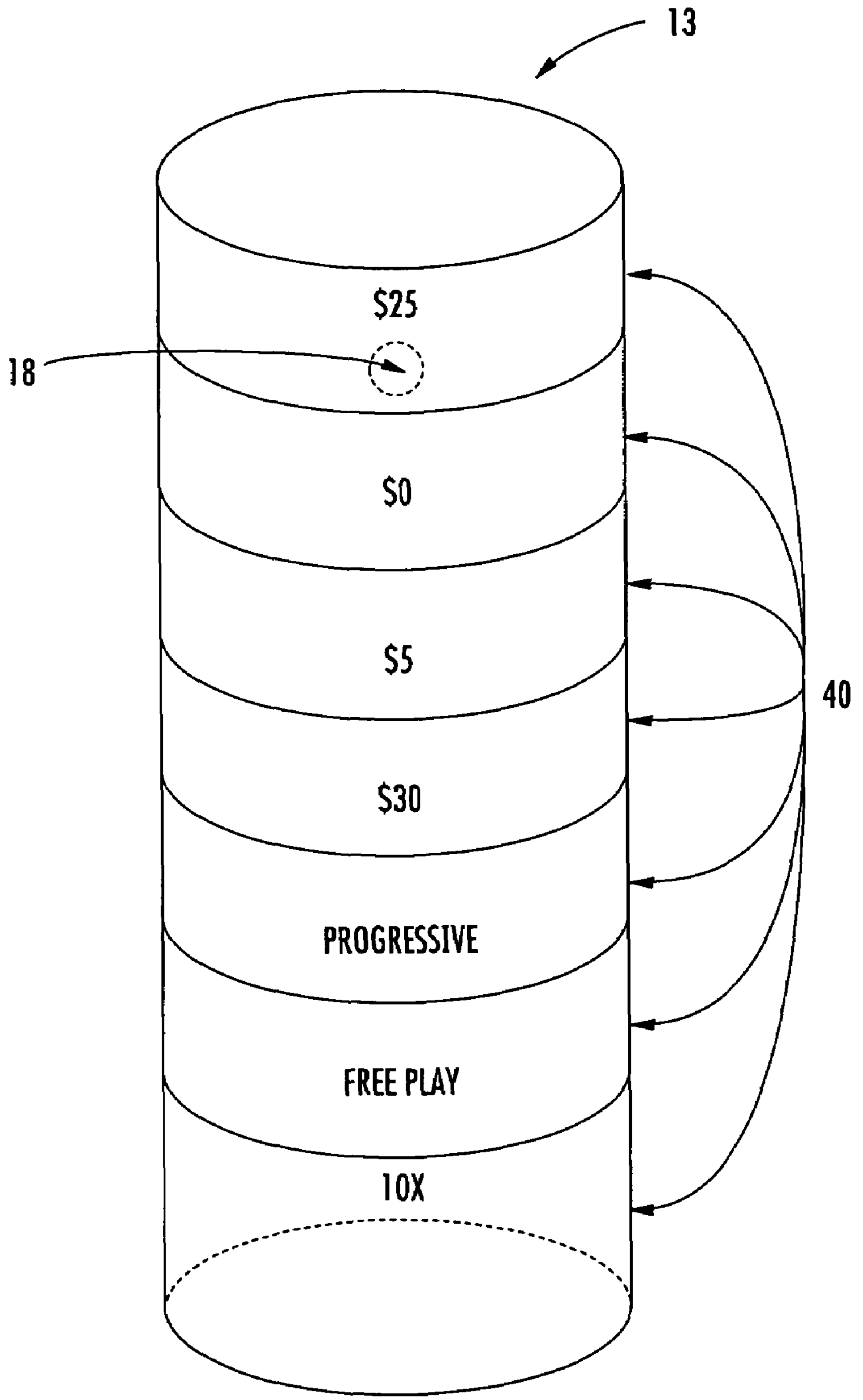
FIG. 1B is substantially a front perspective view of a tubular display container with game-related indicia.

For example, if the random number generator produced a value of 0.03, the display object 18 would be propelled into tubular display container 13 (bearing game-related indicia 40) to location number 1 which corresponds to the $25.00 prize as shown in FIG. 1B. Similarly, if the random number generator produced a 0.85 value, a movable display object 18 would be propelled to location 6 corresponding to a free play prize. The "progressive" prize indicated at location 5 would correspond to a progressive prize created by an array of networked games.

Movable display objects 18 are typically shown either with a letter or a number as game-related indicia in order to convey the game outcome to the player. Other symbols besides letters and numbers may be used, such as colors or images of various types of objects, such as bells, stars and fruits, for example. Typically, indicia on movable display object 18 are used in conjunction with the indicia on tubular display container 13 to indicate the game outcome, for example, when movable display object 18 bears a $ amount and matches up with the 10× multiplier compartment of tubular display container 13. In certain embodiments, movable display object 18 may have no indicia, in which case the game outcome is indicated entirely by the indicia on tubular display container 13 associated with movable display object 18 after it is propelled into tubular display container 13. In other embodiments, movable display objects 18 may bear multiple indicia, such as having a letter, a number and a color.

Figure 1C:
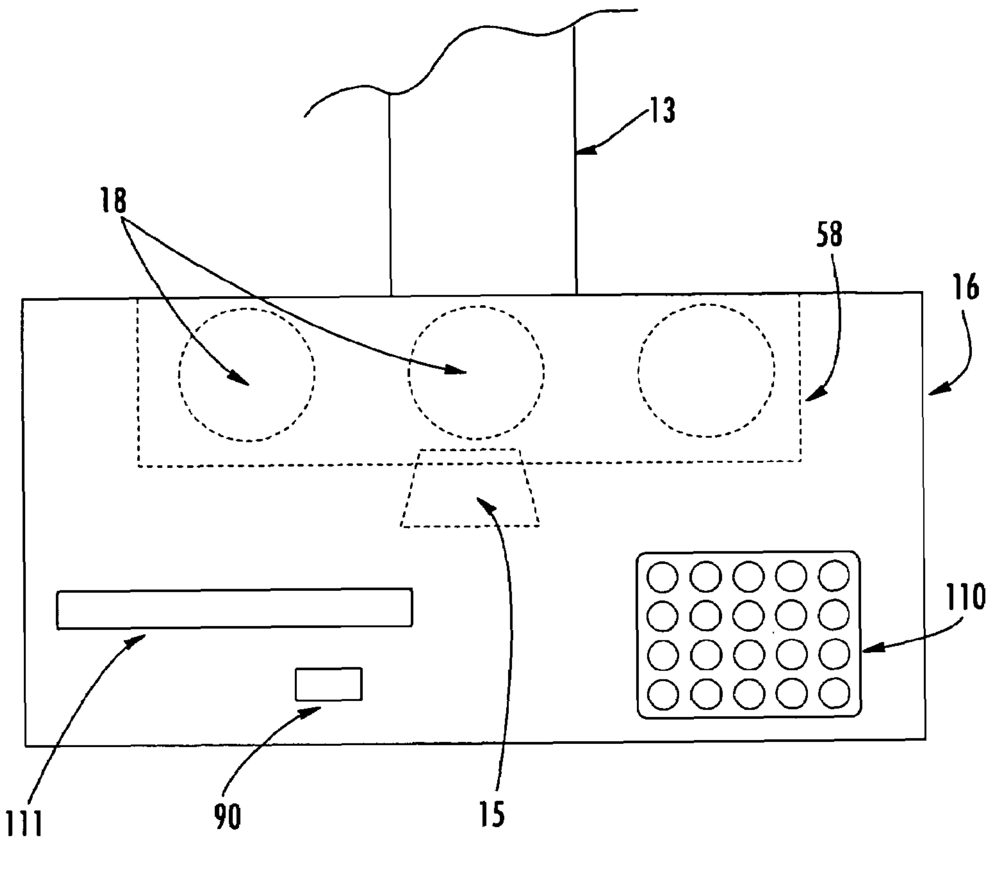
FIG. 1C is substantially an isolated front view of the display base area of the gaming device.

The present invention is not limited to the example pay table shown above. A variety of different tubular display containers 13 may be used which display a variety of prizes (for example, monetary prizes, goods, services or additional game plays) at a variety of different locations on the container. For each different tubular display container 13 a new pay table identifying the appropriate location is loaded into the processor memory combination of controller 82. The goods and services may be awarded in the form of physical objects, tickets, vouchers, and coupons, for example. Additional games may be presented in the form of tickets, such as scratch off-lottery tickets. In the embodiments in which tickets, vouchers and coupons are used, the objects may be dispensed using an internally or externally mounted dispenser 111 (see FIG. 1C). Such dispensers are well known in the art. Additionally, a coin dispenser 27 well known in the art may be used (FIG. 1A). If the actual prize is money, the amount of the prize may be added to the player's credit meter (not shown) or the prize may be dispensed from dispenser 111 or coin dispenser 27.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Tubular Display Container

With continuing reference to FIG. 1A, the display area 11 may include a display housing 12 in addition to tubular display container 13; display housing 12 may enclose tubular display container 13 or be open in the front so that tubular display container 13 is only partially enclosed by display housing 12. Tubular display container 13 is coupled to display object holder 58 located in display base area 16 at the base of displaying housing 12. Display object holder 58 may be made from a variety of materials, such as plastics, metals or composites, for example. In one embodiment, display object holder 58 is cast high-density urethane foam that is machined to obtain a precise shape. In another embodiment, display object holder 58 is injection molded plastic. Display object holder 58 is configured to hold a plurality of movable display objects 18, such as lightweight balls. Typically, movable display objects 18 (hereinafter referred to as prize balls 18) are similar to Keno balls; however, many other types of balls may be used, such as ping-pong balls or rubber balls, for example.

Tubular display container 13 is at least partially transparent allowing players to view prize balls 18 when they are launched into tubular display container 13; tubular display container 13 is made of a transparent material, such as plastic or glass. Suitable containers of this type may be obtained from Tripp Plastics of Reno, Nev. However, tubular display container 13 may also be a wire cage of a type that is used in some Keno games. Although tubular display container 13 is shown in the figures having a cylindrical shape, it is understood that tubular display container 13 may also comprise other shapes, such as modified cylinders. For example, tubular display container 13 may have the form of a cylindrical tower with a polygonal base, such as a triangular- or square-based cylinder, in addition to the conventional circular-based cylinder. Other polygon-based cylinders suitable for use as tubular display containers in the present include, for example, pentagonal-, hexagonal- and octagonal-based cylinders.

Display object holder 58 is further coupled to display object actuator 15 located below display object holder 58 (FIG. 1A). Display object actuator 15 is positioned in alignment with the base of tubular display container 13 so that a selected movable object 18 held in display object holder 58 may be propelled directly into tubular display container 13 upon activation of display object actuator 15. Display base area 16 (see FIG. 1C) may also include display 110, player input device 90 and dispenser 111 in addition to display object holder 58 and display object actuator 15.

Figure 1D:
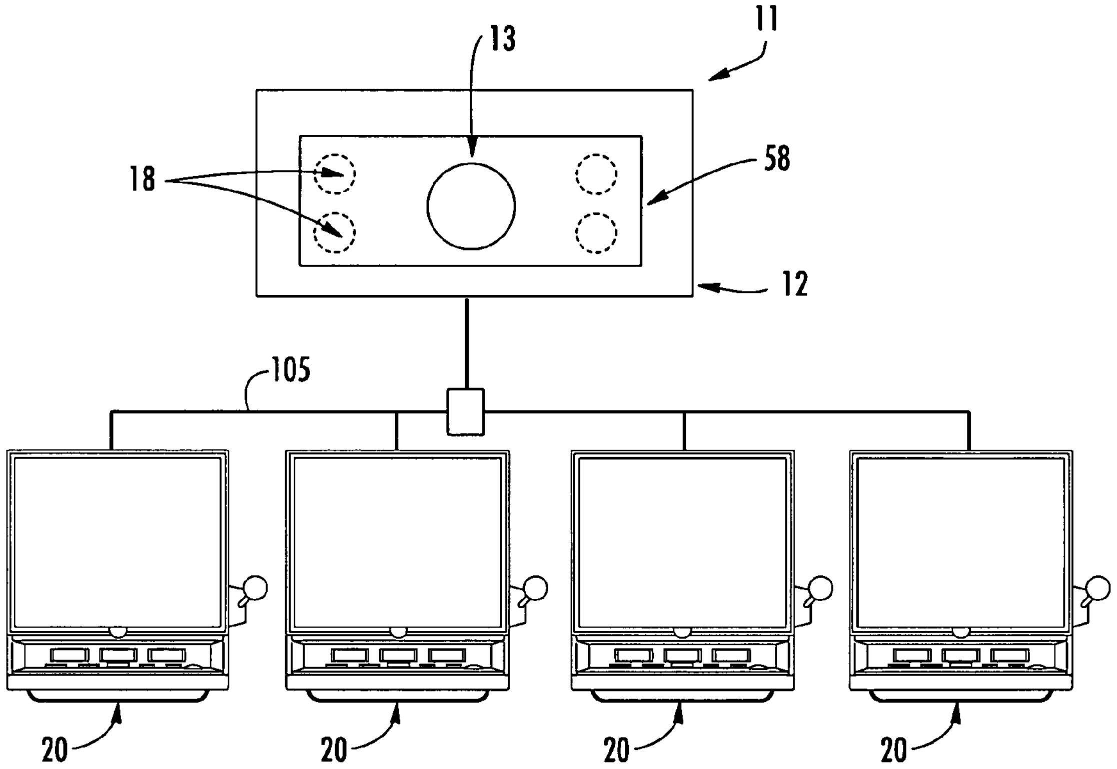
FIG. 1D is substantially a top schematic diagram of a display device in use with a plurality of game apparatus.

As shown in FIG. 1D, a single display area 11 may also be used with a plurality of game apparatus 20. In this embodiment, each game apparatus is in communication with display area 11 by a communication device 105. Communication device 105 may be a network cable, such as an Ethernet cable, and appropriate hardware, such as network interface cards, may be included in display area 11 and game apparatus 20. When one of the game apparatus 20 produces a bonus-activating event, a signal is sent to display area 11 and the game proceeds as described elsewhere.

Figure 1E:
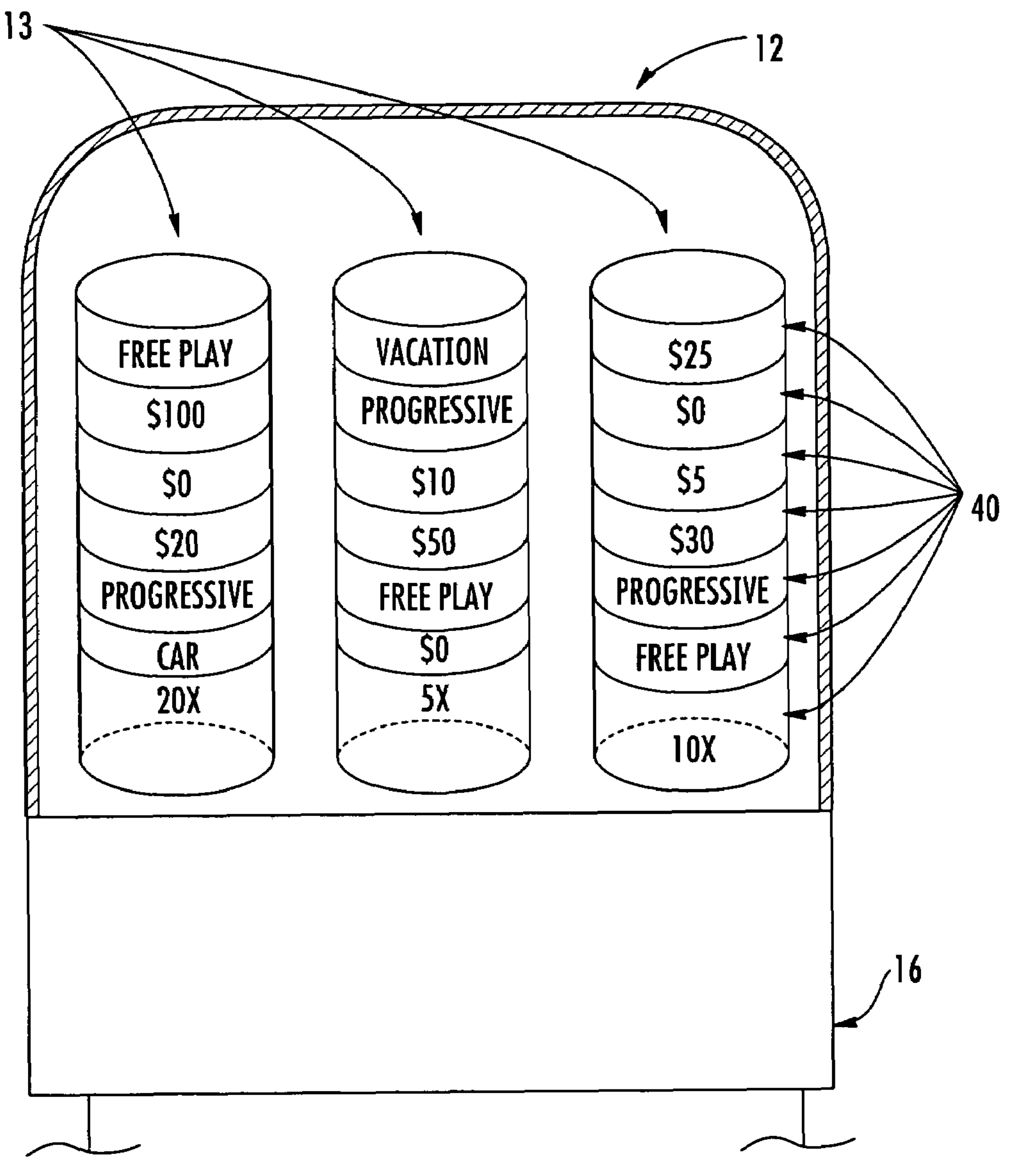
FIG. 1E is substantially a front perspective view of the gaming device having a plurality of tubular display containers.

FIG. 1E depicts an embodiment involving a gaming device having a plurality of tubular display containers 13. Game play may involve one or more of the plurality of tubular display containers in use during a game. FIG. 1E also shows an example where each of the tubular display containers 13 may bear different game-related indicia 40 representing various game outcomes. In another embodiment, where three tubular display containers 13 are part of the gaming device, all three tubular display containers may have prize balls launched into each tubular display container 13 as part of the game, and the game result would be the combination of game outcomes in all three tubular display containers 13. Alternatively, only one of the three tubular display containers 13 may have a prize ball launched into the tubular display container 13 to display the game outcome. This latter aspect can contribute to the surprise and enjoyment of the player due to the unforeseen nature of which tubular display container 13 will be used to set forth the game outcome to the player.

In another embodiment of the present invention, the player may be allowed to "select" a particular tubular display container 13 from the plurality of tubular display containers 13 prior to launching a prize ball 18 from display object holder 58. This manner of player selection is similar to that described below where a player is allowed to "select" a particular prize ball 18 from the plurality of prize balls held in display object holder 58 as part of the game play (use of player input device 90 and display 110 shown in FIG. 1C).

The game outcome is communicated to the player by matching prize ball 18 with a particular location or portion of tubular display container 13. For example, as shown in FIG. 1B, the various game-related indicia 40 on tubular display container 13 convey the game outcome to the player when prize ball 18 becomes associated with a specific game-related indicium 40. In one embodiment, the tubular display containers 13 include segmenting mechanisms (not shown) configured to divide each tubular display container into a plurality of compartments corresponding to the game-related indicia located on the tubular display containers 13. The segmenting mechanism may comprise a plurality of constraining components configured to immobilize the movable display object after the movable display object is propelled into the tubular display container from the display object holder.

Suitable constraining components of the segmenting mechanism include, for example, dividers and partitions that may be activated by a controller 76. As shown in FIG. 2C, for example, controller 76 is in communication with display object actuator 15, display object holder 58 and the segmenting mechanism of tubular display container 13, so that various constraining components of the segmenting mechanism are activated and coordinated with launching of prize ball 18 from display object holder 58 by display object actuator 15. Various sensors associated with tubular display container 13 (located thereon and not shown) may be used to activate the segmenting mechanism and corresponding constraining components to immobilize prize ball 18 in a designated compartment of tubular display container 13, with the resultant combined location of prize ball 18 and game-related indicium on tubular display container 13 corresponding to the game outcome determined by the random number generator.

The segmenting mechanism and constraining components useful in the present invention may take a variety of forms, including for example, sliding plates, panels, screens and telescoping (extension) rods or bars, that are retracted inside the wall of tubular display container 13 when not in use, but are configured to extend a short distance into the interior of tubular display container 13 when activated. These components are typically positioned to extend perpendicularly (at right angles) from the wall of tubular display container 13; however, other angles of extension may be used in order to capture and isolate prize ball 18 in a designated compartment of tubular display container 13. U.S. patent Application Publication No. 2004/0002373 may be consulted for other representative examples of constraining components useful in gaming devices of the present invention.

Constraining components of the segmenting mechanism also may take other forms that do not involve physically constraining prize balls 18 by inserting partitioning components into the interior of tubular display container 13 (as described above). For example, the interior wall of tubular display container 13 may be configured so that receptacle sites are positioned at appropriate locations corresponding to game-related indicia. The receptacle sites may take the form of recessed or cup-shaped areas in the wall so that prize balls 18 may be captured and held in place.

Prize ball detectors associated with the receptacle sites, and in communication with a controller, may be used to determine when a prize ball 18 has been received by a receptacle site. For example, sensors, such as optical, electrical, inductive or magnetic sensors, may be used detect the presence of a prize ball 18 within a receptacle site. Suitable receptacle sites include, for example, suction devices and magnets. For example, in the case where prize ball 18 may be made of, coated with, or contain a magnetic substance, selective activation of a magnet (receptacle site) attracts prize ball 18 to a specific receptacle site (and game-related indicium location). Alternatively, the receptacle site may involve suction devices, for example, fans, vacuums, pneumatic pressure differential and other suitable devices for creating suction.

Alternatively, prize balls 18 may contain a magnetic or metallic substance and when prize ball 18 is proximate to an activated inductive sensor, the metallic or magnetic substance in the ball may cause the inductance of the inductive sensor to change, thereby signaling the controller that a prize ball 18 has "contacted" a designated game-related indicium on tubular display container 13 corresponding to the game outcome. In this case, it is not required that prize ball 18 be actually captured or isolated in tubular display container 13 to signal a game outcome, it is only necessary that the prize ball 18 has reached a certain location and been detected by the controller so that the game outcome can be communicated to the player.

Other sensing mechanisms may be used, including optical sensors such as bar code scanners, for example. Other systems may employ unique semiconductors, or other items, located inside prize balls 18; U.S. Pat. No. 5,799,940 maybe consulted for descriptions of similar and related sensing mechanisms useful in gaming devices of the present invention. Unique transmitters, such as RFID (radio frequency identification) tags may also be placed inside prize balls 18.

Although the game-related indicia on the tubular display containers are typically shown as markings represented by numbers, $ values, goods or services, multiplier factors, free plays and related prizes, the game-related indicia on the tubular display container may also be presented to the player in the form of an LED (light emitting diode) meter. In this case, the LED meter also may be used as a changeable prize display where different prizes are flashed to the player before and during actual game play on the gaming device of the present invention, thus providing additional suspense and surprise for the player regarding the possible game outcomes.

Display Object Actuator

Figure 2A:
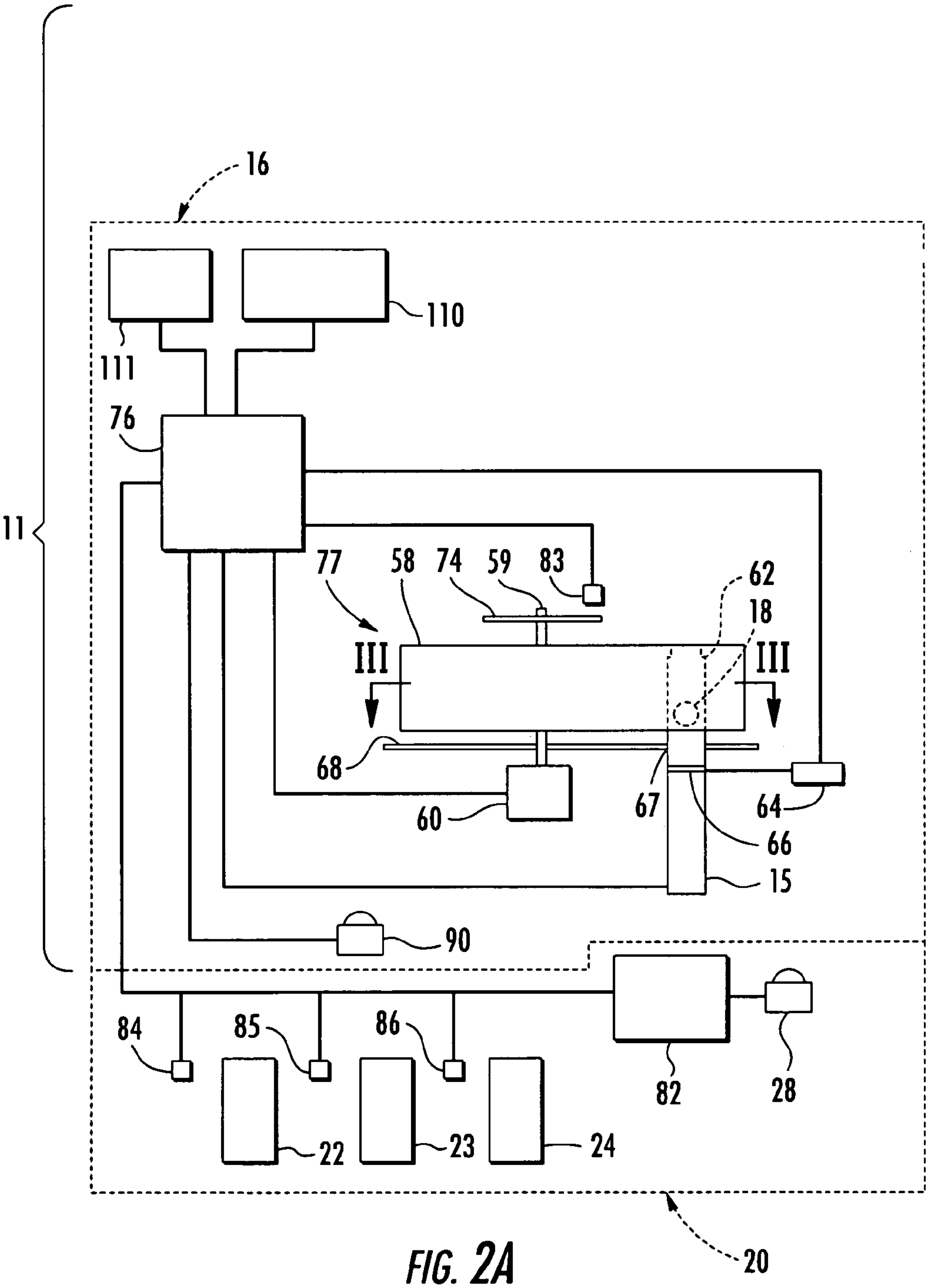
FIG. 2A is substantially a schematic diagram of the display object holder area of the gaming device.
Figure 2B:
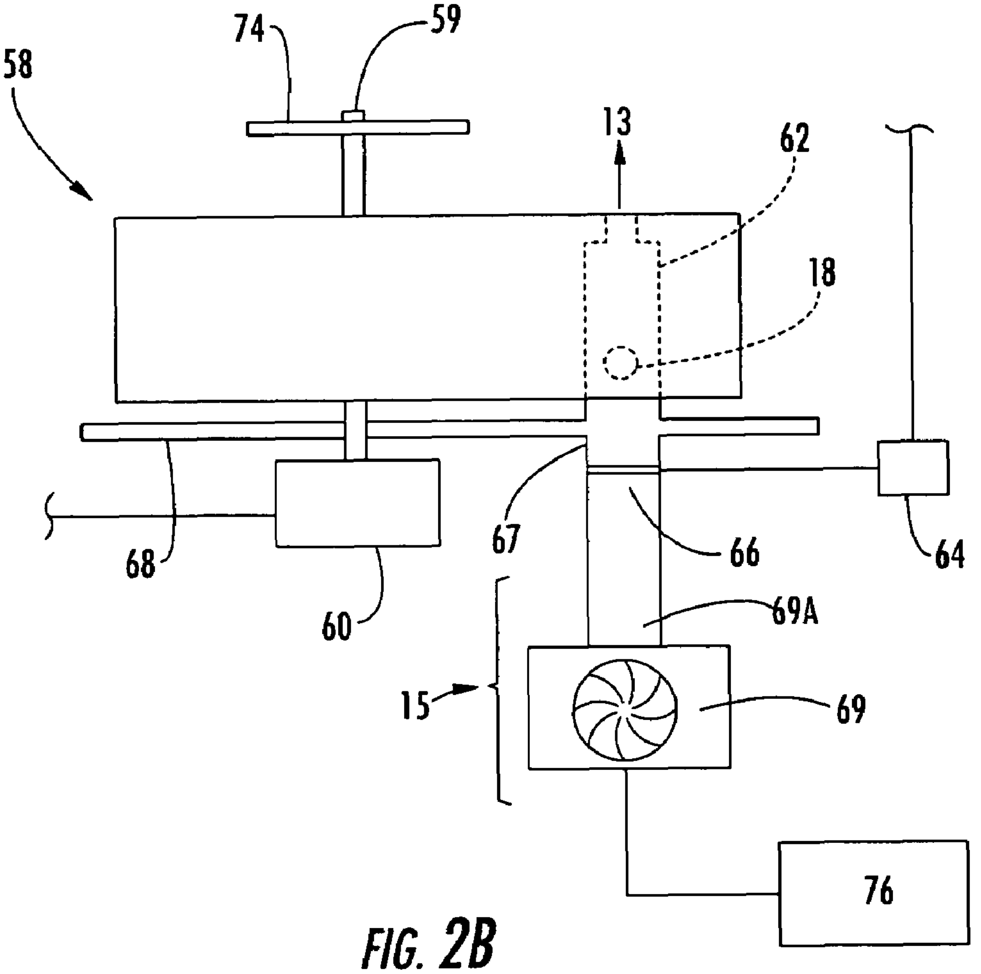
FIG. 2B is substantially a schematic diagram of the display object holder area showing one form of display object actuator for use in the gaming device of FIG. 2A.
Figure 2C:
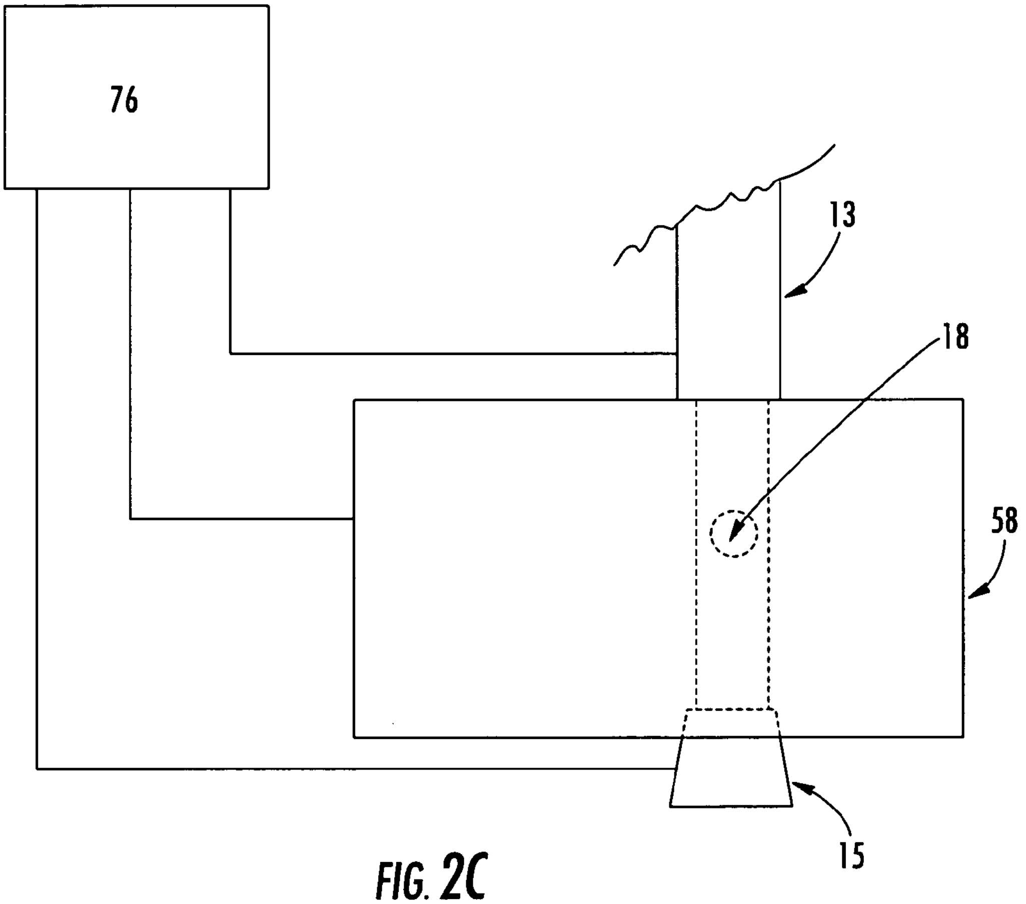
FIG. 2C is substantially a schematic diagram of the display object actuator and tubular display container in relation to the display object holder.
Figure 2D:
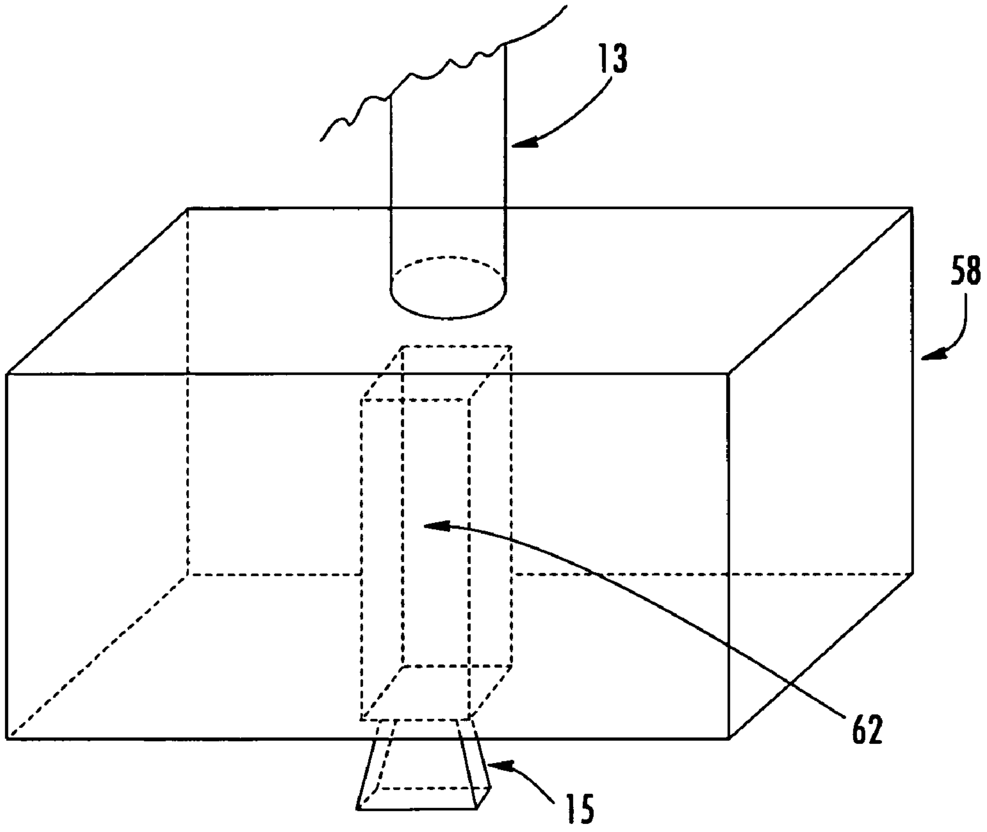
FIG. 2D is substantially a front perspective view of a selected portion of the display base area highlighting the spatial relationship of the display object actuator, the tubular display container and the display object holder.

FIG. 2D depicts a selected portion of display base area 16 (not shown) that concentrates on the spatial relationship between display object actuator 15 and tubular display container 13 with respect to display object holder 58 (shown here in black box representation—see FIG. 2A for specific details of display object holder 58). FIG. 2C shows the same components in a schematic format in reference to their interactive communication via controller 76. Referring again to FIG. 2D, display object actuator 15 is aligned with each tubular display container 13 and positioned under display object holder 58 so that when a selected prize ball 18 (not shown) is positioned in chamber 62, the prize ball 18 may be impacted by display object actuator 15 and propelled into tubular display container 13. Suitable display object actuating devices for use in the present invention include, for example, spring mechanisms, piston devices and gas injectors (such as pressurized air, blowers, and high speed fans).

Typically, tubular display container 13 is positioned in an upright or substantially vertical position and prize ball 18 is propelled straight up into tubular display container 13 upon activation of display object actuator 15 (FIG. 1A). However, it is understood that tubular display container 13 may positioned at other angles and various orientations relative to gaming apparatus 20. In the case where a plurality of tubular display containers 13 is provided as part of display area 11, the tubular display containers are typically aligned parallel to each other, such as shown in FIG. 1E. However, it is understood that the present invention allows for other arrangements of multiple tubular display containers, such as where the tubular display containers are not configured parallel to each other, but may be tilted so that they point towards each other.

Display Base Area

Returning again to FIG. 2A, display base area 16 also comprises a controller 76 that is configured to control the operation of the gaming device. Controller 76 may be one or more computers or processor boards. For example, in one implemented embodiment, controller 76 comprises a bonus controller and stepper motor controller, which may be manufactured by Progressive Solutions in Carmichael, California, a core module by Z-World in Davis, California, and a sound board by Cleverdevices in Syosset, New York. Other, equally suitable devices may be purchased from other manufacturers. It is recognized that controller 76 may be a single processor or processor board. Furthermore, it is also recognized that controller 76 and controller 82 may be combined in a single processor or processor board.

Controller 76 may be configured to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to the gaming device to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights, and light emitting diodes (LED), for example. Display 110 may comprise its own controller that is configured to generate a variety of displays.

Display 110 may indicate that a player has qualified for a bonus round and prompt the player to perform an action. In one embodiment, the player may be prompted to activate the bonus sequence by pressing player input device 90. Input device 90 may be a simple button, a keyboard, or a touch screen display. In the embodiment in which the player must accumulate a number of bonus symbols to qualify for a bonus, display 110 may indicate the number of symbols the player has received.

In another embodiment, input device 90 may be used to allow the player to "pre-select" a particular prize ball 18 from the plurality of prize balls held in display object holder 58. For example, when controller 76 detects input device 90 being activated by a player, the controller may automatically initiate a display of available prize balls 18 held in display object holder 58 by a presentation on display 110. The player may then select one of the prize balls 18 shown on display 110 by further activation of player input device 90 (or by interaction with display 110, see below). The next phase of the game then would be initiated and the player would be able to view the game outcome and see if the particular "pre-selection" of prize ball 18 resulted in an enhanced winning result.

In one embodiment, the player may be allowed to select a symbol or symbols from a list of symbols shown in display 110. In this case, display 110 may be presented in the form of a touch screen or keypad (see FIG. 1C) where the player may select the symbol by pressing the symbol with the player's finger. Other selection devices, such as buttons, may also be used. The symbols are meant to match the game-related indicia on the prize balls 18 available for launch into tubular display container 13 upon initiation of game play. It is understood that inclusion of player input device 90 is optional and that game playing is contemplated that does not involve use of display 110 to allow the player to "pre-select" a particular prize ball 18 before a prize ball 18 is launched into tubular display container 13.

Again referring to FIG. 2A, prize balls 18 are stored in display object holder 58 in an individually controlled manner so that individual prize balls can be selectively removed from the display object holder. This allows particular balls with particular game-related indicia (symbols or values) to be individually manipulated and positioned for subsequent launching by activation of display object actuator 15. This may be accomplished in different ways. In one embodiment, display object holder 58 comprises a chamber 62 for each prize ball 18 stored in the holder.

Figure 3:
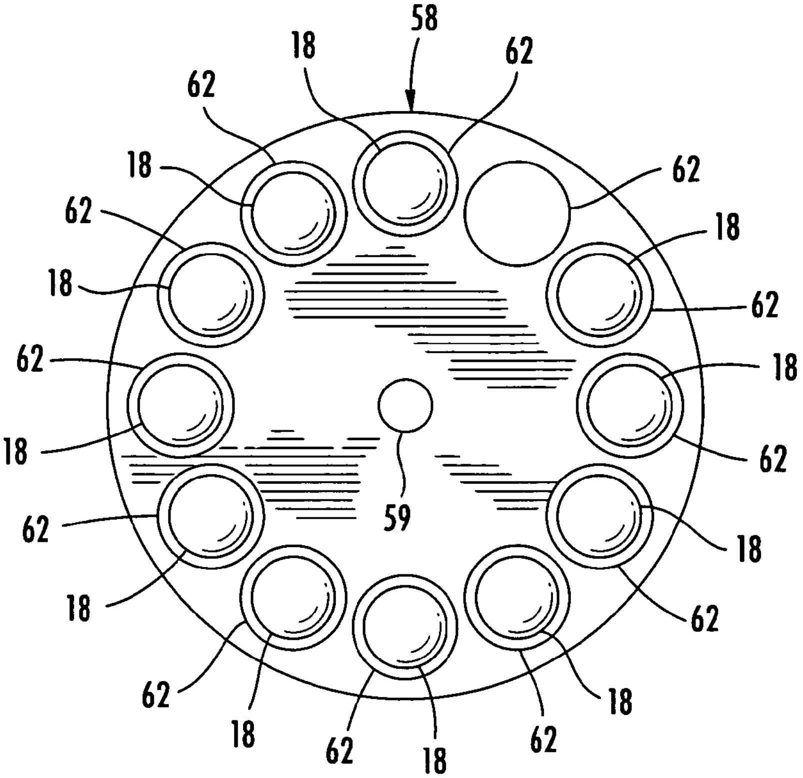
FIG. 3 is substantially a top cross sectional view of a display object holder taken along line III in FIG. 2A.

In another embodiment, display object holder 58 is cylindrical as illustrated in FIG. 3. Chambers 62 are positioned outward from a central axis 59 of display object holder 58, near the periphery of the holder. Thus, chambers 62 may be positioned by rotating display object holder 58 around its central axis 59.

Figure 4:
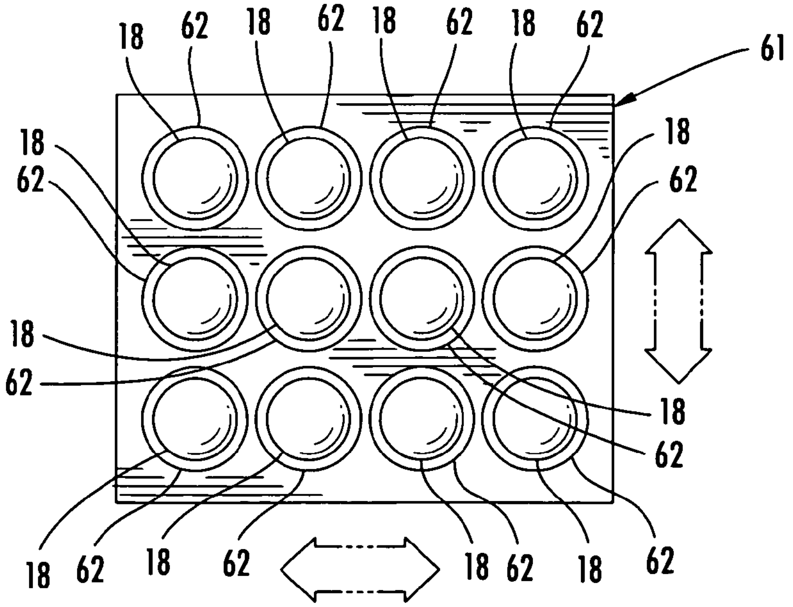
FIG. 4 is substantially a top cross sectional view of an alternative display object holder.

Display object holder 58 maybe provided in different configurations. For example, as shown in FIG. 4, display object holder 61 may be square or rectangular with chambers 62 arranged in rows and columns. In this embodiment, controller 76 (FIG. 2A) is programmed with the location of chambers 62 and display object holder 61 is positioned by moving it laterally and longitudinally. Stepper motors and gears may perform the lateral and longitudinal positioning (not shown).

Returning to FIG. 2A, positioning mechanism 77 comprises a stepper motor 60 for rotating holder 58. Wheel 74, rigidly attached to holder 58, and sensor 83, not attached to the holder, are provided for determining the angular position of the holder. Thus, controller 76 can position a prize ball 18 in display object holder 58 by rotating the holder and monitoring its angular position. The angular position of each prize ball 18 is stored in memory in controller 76. Sensor 83 may be an infrared source and detector and the periphery of wheel 74 may comprise portions with different reflective characteristics, such as physical holes or gaps or absorbent paint lines. Alternatively, an optical flag configuration may be used; U.S. Pat. No. 4,911,449 may be consulted for additional details and specific examples of optical flags.

In another embodiment, a chassis (not shown) may be used to support display object holder 58 (FIG. 2A) at approximately a forty-five degree angle to the vertical. Mounting grooves (not shown) may be provided in display base area 16 for slidably receiving the chassis and connectors may be provided for connecting electrical circuits and devices to power supplies and controller 76. One of the advantages of this embodiment is that positioning mechanism 77 can be easily serviced by removing the chassis from display base area 16.

Figure 5:
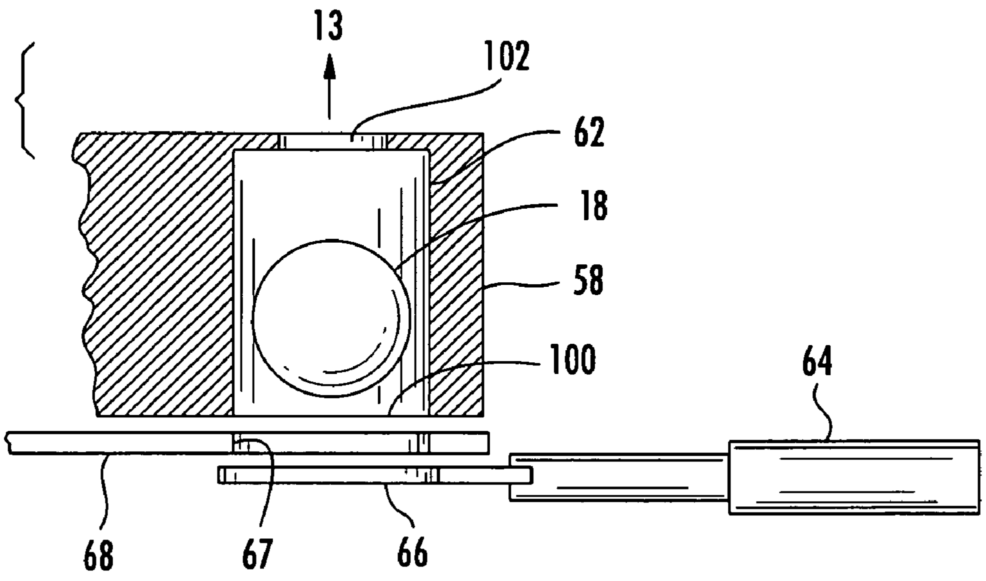
FIG. 5 is substantially an enlarged view of a section of the display object holder shown in FIG. 2A.

Display object holder 58 is arranged to allow alignment of display object actuator 15 with a selected prize ball 18 and base entry to tubular display container 13 (FIG. 2C). Referring now to FIGS. 2A and 5, each chamber 62 has a lower opening 100 that is large enough for access to prize ball 18. A plate 68 is provided on the lower surface of display object holder 58 for preventing prize balls 18 from falling out of chambers 62. A hole 67 is provided in one portion of plate 68 for allowing access to prize ball 18. A gate 66 blocks access to prize ball 18 until it is opened by an actuator 64. Gate 66 may cover the entire hole 67 or just a portion of it and it may be operated in a sliding or hinged manner. Actuator 64 may be an electrical solenoid actuator. An upper opening 102 is provided in chamber 62 for allowing access to a tubular display container 13. Display object actuator 15 is shown coupled to the base of display object holder 58 (FIG. 2A)

FIG. 2B illustrates an embodiment where display object actuator 15 comprises an air source or blower; in this case, a fan 69 may be used to force air through duct 69A to impact prize ball 18 in chamber 62. When activated by controller 76, fan 69 operates and creates a stream of air that forces prize ball 18 from chamber 62 into tubular display container 13. Although many fans can be used, one suitable fan is DC brushless fan motor model number BG0703-B044-000 available from Minebea Co., Ltd. of Tokyo, Japan. It is understood that other air sources besides fans also may be used.

Video Display Embodiment

Figure 6:
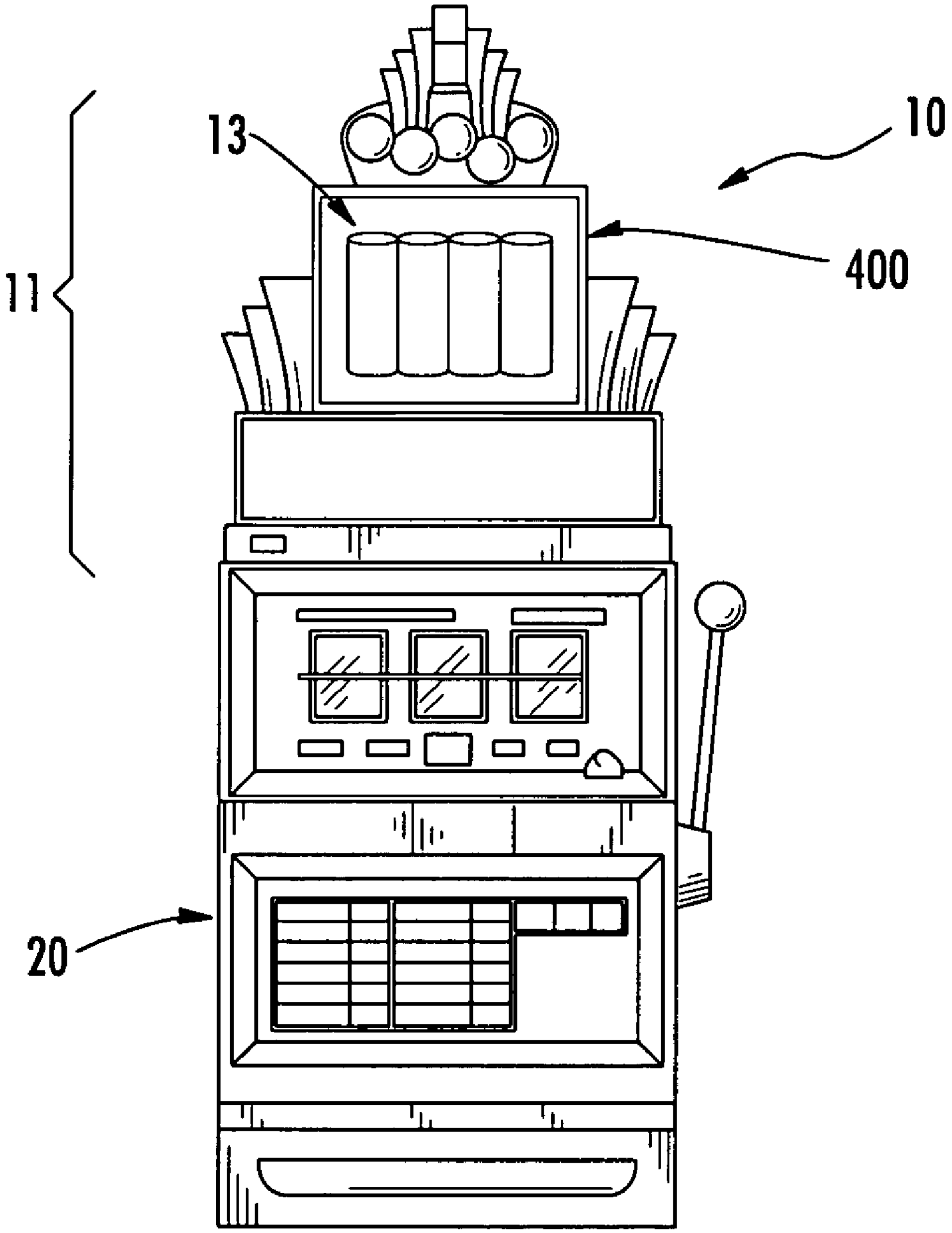
FIG. 6 is substantially a front view of the gaming device utilizing a video display device.

As shown in FIG. 6, an alternative embodiment of the present invention utilizes a video display device. In this embodiment, display housing 12, tubular display container 13 and display base area 16 (see FIG. 1A) have been replaced by video display device 400. Video display device 400 presents an image of tubular display container 13 and prize balls 18 that is shown to the player. Video display device 400 may be any of a large number of display devices that are well known in the art. For example, video display device 400 may be a cathode ray tube of a type that is used with many personal computers.

Video display device 400 is in communication with controller 76 of FIG. 2A. Controller 76 transmits messages to video display device 400 to request the display device to produce different displays. For example, controller 76 may send a signal to video display device 400 when a bonus activating event has occurred to show tubular container 13 with prize ball 18 in a specific prize location.

Video display device 400 may comprise a video controller (not shown) that drives the display device to present various displays. Many different well-known video controllers may be used. Software and data used to produce different presentations may be stored on the video controller in nonvolatile memory, such as compact disks, magnetic disk drives, or erasable programmable read only memory (EPROM).

It is understood that video display device 400 may display other information in graphic and text form, such as instructions on how to use gaming device 10. Speakers may also be provided for presenting audio information, such as the sound of agitated balls or music when a prize is won.

This video display embodiment has the advantage of reducing maintenance because the moving parts of the tubular display container 13 and display object holder 58 may be eliminated. This embodiment also provides greater flexibility because many different kinds of presentations may be displayed on the video display device 400.

Gaming device 10 disclosed in FIG. 6 utilizes video display device 400 in place of tubular display container 13, but display base area 16 (not shown) also may be physically provided to allow the player to optionally select prize balls 18 (as previously described), in which case the video display shows the apparent result of the player's selection upon launch of prize ball 18 into the video display of tubular display container 13. However, it is recognized that video display device 400 may be used in place of display base area 16 as well. In this latter embodiment, video display device 400 would display a prize ball 18 that appears to be launched into tubular display container 13 to present a game outcome to the player (no prize ball 18 pre-selection by the player).

Game Play Flow Chart

Figure 7:
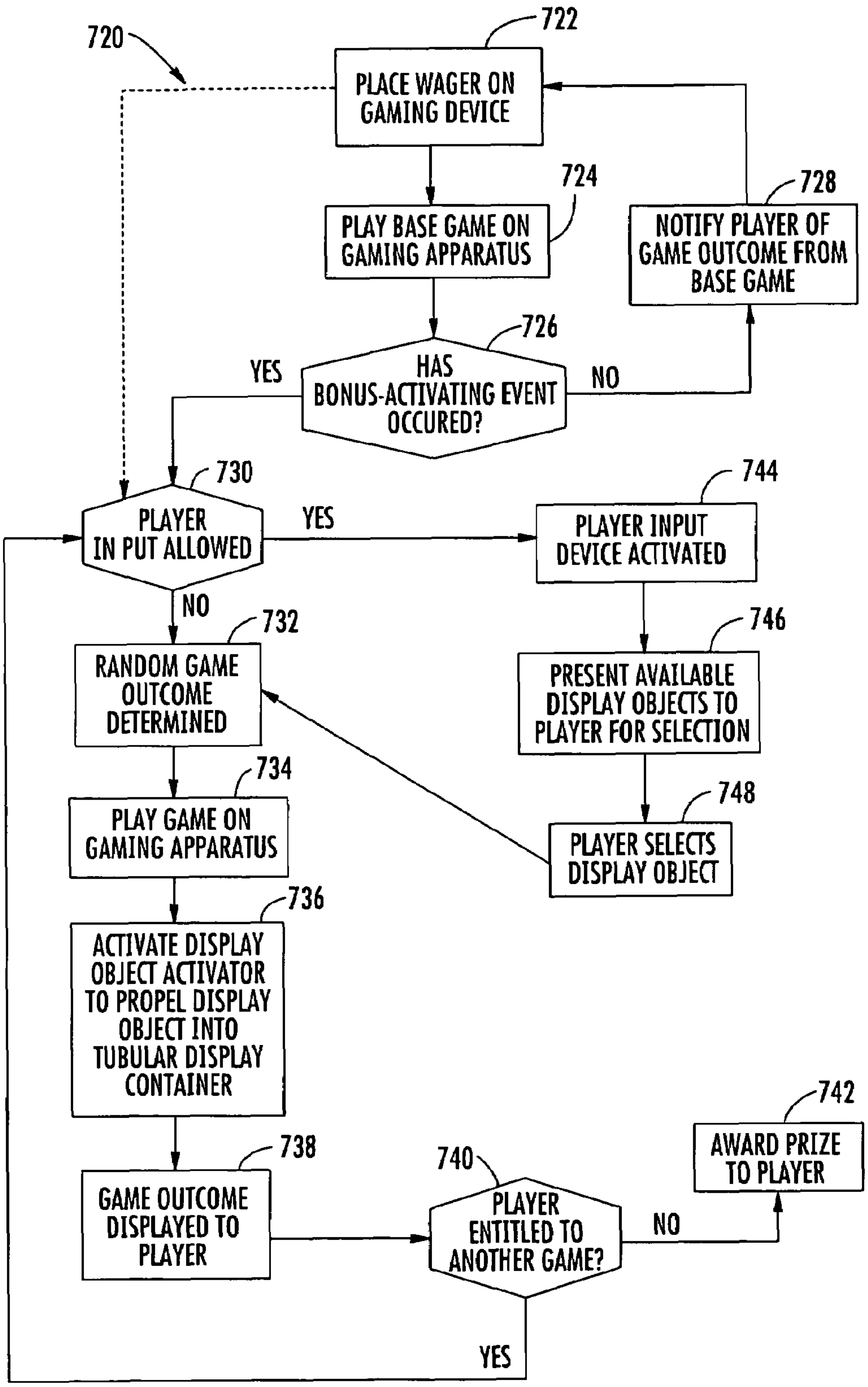
FIG. 7 is substantially a flow chart of one of the many possible game plays on the gaming device.

Referring now to FIG. 7, a flowchart of a game play 720 involving possible bonus play is shown. At step 722, a player typically initiates game play 720 by placing a wager on the gaming device. The wager may be in form of cash or credit from actual domestic or foreign currency, vouchers, coupons, tickets, electronic cards and other sources or forms of wagers known in the art. Once the player initiates game play 720, the player may play a base game on the gaming apparatus at step 724. At step 726, the controller (not shown) detects the occurrence of a bonus-activating event. If the controller does not detect a bonus-activating event, then the controller notifies the player of the game outcome from the base game at step 728. The player may place a wager again and repeat steps 722 and 724 to continue playing a game on the gaming apparatus.

If the controller detects a bonus-activating event, the controller determines if the player is to be allowed to pre-select a prize ball (movable display objects 18 in FIG. 1A) from the plurality of prize balls available in the display object holder (58 in FIG. 1A) at step 730. If player input is allowed, the controller activates a player input device (90 in FIG. 1C) for use by the player at step 744. The controller then presents the possible display objects for selection to the player (step 746) and the player selects a display object (step 748); alternatively, player "selection" may involve designating a specific tubular display container 13 from several tubular display containers 13 available on the gaming device. The game then proceeds to step 732 where a random game outcome is determined, followed by initiation of game play on the gaming apparatus at step 734.

If no player input was allowed at step 730, the game proceeds directly to steps 732 and 734. The bonus game is played (step 734) and the display object actuator is activated to propel the prize ball into the tubular display container at step 736. The game outcome is displayed to the player at step 738 (matching of prize ball 18 with prize indicia 40 on tubular display container 13—see FIG. 1B). At step 740 the controller detects if the player is entitled to play another game as a result of the game outcome; if yes, the cycle repeats beginning at step 730. If no further game play is detected, the prize as a result of the game outcome is awarded to the player at step 742. The steps shown in the flowchart do not necessarily imply that the steps have to take place in a particular order. The order of steps may be varied; some steps may be eliminated; and, some steps may be replaced with other steps. Such variations still fall within the scope of the invention.

Although the flowchart in FIG. 7 outlines game play involving a bonus game, the same flowchart also may represent an embodiment of the present invention involving base game play without a bonus game. In this case, a player would initiate game play by placing a wager on the gaming device at step 722 and the game would proceed directly to step 730 (bypassing steps 724 and 726). The game would then proceed similarly to that described above in steps 732 through 748.

One of the advantages of providing the games discussed above is to increase the excitement and enjoyment of playing gaming device 10. Not only are the games entertaining to view, but they also increase the excitement and enjoyment experienced by players by offering large prizes. Each of the games can be adapted to award large prizes because they are capable of producing low probability events from which the large prizes are awarded. In addition, the games may be adapted for use as the primary game. Thus, game apparatus 20 may be completely replaced with the games of the present invention.

It can thus be seen that these embodiments can solve one or more problems associated with the prior art or provide advantages over prior art devices. Thus, embodiments of the present invention provide gaming devices that utilize highly visible display devices that may be used with primary games or bonus games. These embodiments also can provide display devices that eliminate environmental influences on the outcome of the game. These embodiments can, in addition, provide display devices that reduce the risk of tampering, require no human operators, and require little maintenance.

There are other features and advantages of one or more of the various embodiments. They should be apparent to those skilled in the art based on the disclosure above. Although the description above contains many specifications, these should not be construed as limiting the scope of the invention but as merely providing illustrations of some of the presently preferred embodiments of this invention. This specification above, for instance, makes reference to bonus prizes. However, the present invention is not thereby intended to be limited to providing bonus prizes. Rather it is intended that the present invention can, in certain embodiments, be used independently as a stand-alone game without necessarily including bonusing. Thus, the scope of the invention should be determined by the claims as issued and their legal equivalents rather than by the examples given.

We claim:

1. A gaming device comprising:

(a) a gaming apparatus configured to allow a player to place a wager and play a game;

(b) at least one tubular display container coupled to the gaming apparatus and configured to convey a game outcome to the player;

(c) a plurality of movable display objects;

(d) at least one display object holder coupled to the tubular display container and configured to hold the plurality of movable display objects in an individually controlled manner;

(e) at least one display object actuator associated with the display object holder, wherein the display object holder and the display object actuator are configured to allow a selected movable display object from the display object holder to be propelled into the tubular display container by activation of the display object actuator; and (f) at least one controller in communication with the gaming apparatus, the tubular display container, the display object holder and the display object actuator, wherein the controller is configured to select one movable display object from the plurality of movable display objects in the display object holder.

2. The gaming device of claim 1 wherein the tubular display container comprises game-related indicia located thereon and wherein the game-related indicia are used to communicate the game outcome to the player.

3. The gaming device of claim 2 wherein the tubular display container further comprises a segmenting mechanism configured to divide the tubular display container into a plurality of compartments corresponding to the game-related indicia located thereon, and wherein the segmenting mechanism is in communication with the controller.

4. The gaming device of claim 3 wherein the segmenting mechanism comprises a plurality of constraining components configured to immobilize the movable display object after the movable display object is propelled into the tubular display container from the display object holder.

5. The gaming device of claim 3 wherein the controller is configured to determine a random game outcome and display the game outcome to the player by activating the display object actuator and the segmenting mechanism.

6. The gaming device of claim 1 wherein the plurality of movable display objects comprise shapes selected from the group consisting of spherical, polyhedral, animal and human shapes.

7. The gaming device of claim 1 further comprising at least one sensor associated with the tubular display container wherein the sensor is in communication with the controller.

8. The gaming device of claim 1 further comprising at least one player input device configured to allow the player to select a movable display object from the plurality of movable display objects in the display object holder prior to activation of the display object actuator.

9. The gaming device of claim 1 wherein the display object actuator is selected from the group consisting of a spring mechanism, a piston device and a gas injector.

10. The gaming device of claim 1 wherein the tubular display container is positioned in a substantially vertical position.

11. The gaming device of claim 1 wherein the display object holder is configured so that the movable display objects in the display object holder are hidden from view of the player.

12. The gaming device of claim 1 further comprising a plurality of tubular display containers and at least one player input device configured to allow the player to select a tubular display container from the plurality of tubular display containers prior to activation of the display object actuator.

13. A method of conducting a game on a gaming device comprising, but not necessarily in order shown:

(a) allowing a player to place a wager and play the game on the gaming device;

(b) randomly determining a game outcome;

(c) holding a plurality of movable display objects in an individually controlled manner in a display object holder;

(d) providing a controller to select one movable display object from the plurality of movable display objects in the display object holder;

(e) propelling the selected movable display object from the display object holder into a tubular display container by activating a display object actuator associated with the display object holder; and (f) configuring the tubular display container to convey the game outcome to the player.

14. The method of claim 13 further comprising associating game-related indicia on the tubular display container with game-related indicia on the movable display objects wherein the indicia communicate the game outcome to the player.

15. The method of claim 13 further comprising isolating the movable display object in a selected compartment of a plurality of compartments in the tubular display container by activating a segmenting mechanism associated with the tubular display container to immobilize the movable display object in the selected compartment of the tubular display container.

16. The method of claim 15 further comprising using sensors on the tubular display container to activate the segmenting mechanism to immobilize the movable display object in the selected compartment of the tubular display container corresponding to the game outcome.

17. The method of claim 13 further comprising allowing the player to select the movable display object from the plurality of movable display objects in the display holder, by way of a player input device in communication with the controller, prior to propelling the movable display object from the display object holder into the tubular display container.

18. The method of claim 13 further comprising (i) providing a plurality of tubular display containers, and (ii) allowing the player to select a tubular display container from the plurality of tubular display containers, by way of a player input device, prior to propelling the movable object from the display object holder into the tubular display container.

19. The method of claim 13 further comprising hiding the movable display objects in the display object holder from view of the player.

20. A gaming device comprising:

(a) a plurality of movable display object means for conveying a game outcome to a player;

(b) tubular container display means for conveying the game outcome in conjunction with the movable display object means;

(c) display object holding means for holding the plurality of display object means in an individually controlled manner;

(d) display object actuator means for propelling the movable display object means into the tubular container display means; and (e) controller means for determining a random game outcome, selecting one movable display object means from the plurality of movable display object means in the display object holding means and activating the display object actuator means to propel the selected movable display object means from the display object holding means into the tubular container means to display the game outcome to the player.

21. The gaming device of claim 20 further comprising segmenting means for dividing the tubular display container means into a plurality of compartments for isolating the movable display object means.

* * * * *